Figure 4:
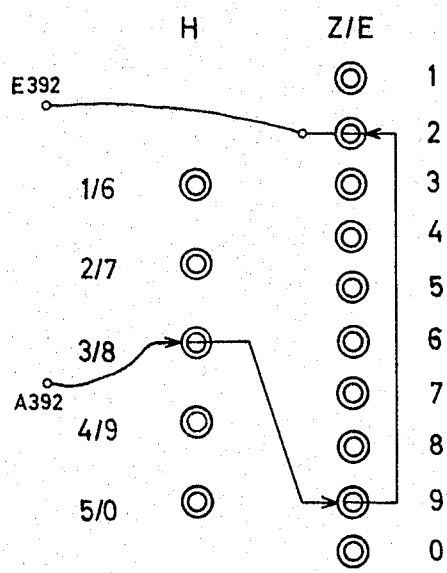

Dec. 6, 1966   K. FISCHER ETAL   3,290,445
AUTOMATIC RING CORE IDENTIFICATION SYSTEM
Filed April 15, 1963   2 Sheets-Sheet 1
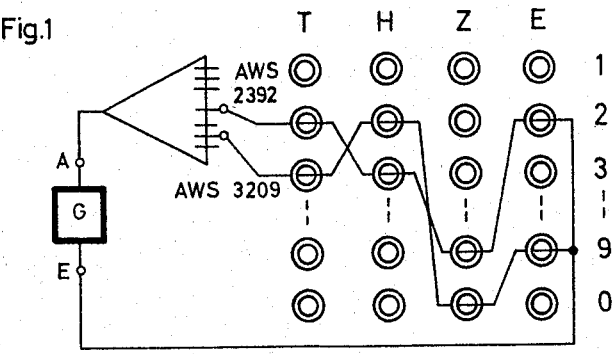
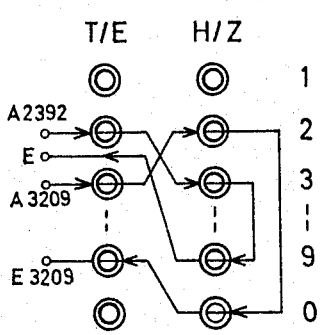
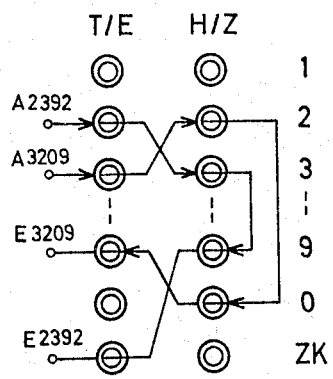
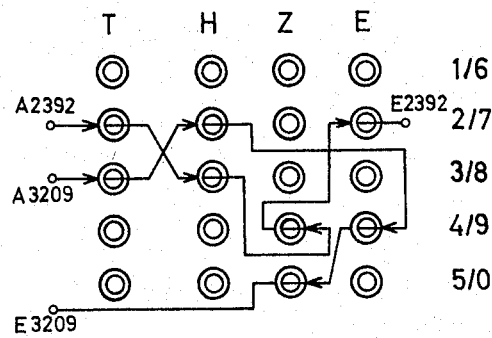
INVENTORS
*Kurt Fischer*
*Wolfgang Müller*
BY
ATTYS.

United States Patent Office 3,290,445
Patented Dec. 6, 1966

3,290,445
AUTOMATIC RING CORE IDENTIFICATION SYSTEM
Kurt Fischer and Wolfgang Müller, Munich, Germany, assignors to Siemens & Halske Aktiengesellschaft, Berlin and Munich, Germany, a corporation of Germany
Filed Apr. 15, 1963, Ser. No. 273,118
5 Claims. (Cl. 179—18)

The invention disclosed herein is concerned with ring core evaluation fields for number identification or number reforming devices, as used, for example, in telephone systems for the identification of subscriber lines for call metering purposes.

Known ring core evaluation fields generally comprise a plurality of repeater cores disposed in columns and rows. The columns signify the individual places within a marking combination and the rows signify the marking values which can appear at each place of the respective marking combinations. Accordingly, with $n$ place markings and $m$ value markings corresponding to $n$ columns and $m$ core rows, can be represented $m^n$ marking combinations with a total of $n \cdot m$ ring cores. The determination of the individual marking combinations is effected with the aid of evaluation loops which are according to the respective marking combination linked with a number of ring cores corresponding to the number of places per marking combination, that is, respectively with a ring core from each column. For the determination of these marking combinations which are ascertained by the individual evaluation loops, there is closed an evaluation loop over a signal generator, thereby effecting energization of the ring cores linked with the operatively connected evaluation loop. The core combination representing the marking combination is then ascertained by checking the individual ring cores as to the energized condition thereof.

The present invention is accordingly concerned with a ring core evaluation field for number identification or number reforming devices, especially for telephone systems, having a plurality of ring cores arranged in columns and rows and a plurality of evaluation loops linked with these ring cores according to the associated marking combinations, whereby the columns designate, for example, the places of marking combination while the rows designate the markings to be evaluated per place, so that a fixed evaluation symbol is allocated to each ring core.

The object of the invention is to simplify the known ring core evaluation fields.

This object is realized by allocating to the individual ring cores of always one of the two marking groups (place marking and value marking, respectively) two different markings (for example, two value markings or two place markings, respectively) and by effecting an operation such that the marking of the two possible similar markings which is to be evaluated per core, is determined by the magnetization direction effected by the marking evaluation loop.

The allocation of always two place markings or two value markings, respectively, per ring core, and the evaluation of these two possible markings, dependent upon the magnetization direction effected by the evaluation loop, reduces by fifty percent the number of ring cores required for the evaluation field.

Another advantage resides in that the internal and external interference effects due to the mutual coupling of the evaluation loops are from the outset excluded, owing to the layout of the individual evaluation loops in accordance with the invention, in a similar manner as in connection with a previously proposed coded ring core evaluation field, so that the ring core evaluation field according to the present invention is without auxiliary expenditure also applicable in cases in which a plurality of evaluation loops are simultaneously closed as, for example, in the case of definite connection of the evaluation loops to the line conductors of telephone connections and closure of the individual evaluation loops by way of subscriber lines. While it is also possible to reduce the expenditure with respect to ring cores, in the coded wiring of the previously proposed ring core evaluation field, the ring core evaluation field according to the present invention has the advantage that the individual markings can be derived from a single ring core and not from two different ring cores as is, for example, the case in a wiring according to the "2 out of 5"- code. The wiring is therefore more secure and can be supervised in simpler manner.

The invention encompasses a plurality of embodiments operating substantially in equivalent manner. For example, in the case of $m$ different places within the marking combination, $m/2$ or $(m-1)/2+1$ core groups, for example, columns, can be provided for the markings of the individual places in accordance with an even or an odd total number of places. It is likewise possible, in the case of $n$ required markings to provide per place of the marking combinations determined by evaluation loops, $n/2$ or $(n-1)/2+1$ core groups, for example, rows, for effecting the individual markings in accordance with an even or odd total number of markings. A third possibility resides in a combination of the two modes of marking.

Further details of the ring core evaluation field according to the invention will appear from the description of some embodiments thereof which is rendered below with reference to the accompanying drawings, wherein FIG. 1 shows a known ring core evaluation field;

FIGS. 2a and 2b indicate ring core evaluation fields having according to the invention a reduced number of columns;

FIG. 3 represents a ring core evaluation field according to the invention, having a reduced number of rows; and FIG. 4 shows a ring core evaluation field according to the invention, representing a combination of the principles employed in connection with the embodiments indicated in FIGS. 2a to 3.

In the known ring core evaluation field according to FIG. 1, characters T, H, Z and E indicate respectively the ring core columns corresponding to the thousands-, hundreds-, tens- and units digits of a four digit number, and the rows 1 to 0 represent the ten numerical values which are possible per place. The evaluation loops, for example, AWS 2309 and AWS 3209 which are linked with the ring cores according to the individual four-place numbers, for example 2309 and 3209, can be successively closed over a generator G, so as to always effect energization only of ring cores which are passed by the respective closed evaluation loop, for example, the ring cores T2, H3, Z9 and E2, thus making it possible to produce a signal by the action of appropriate readout windings (not shown).

FIGS. 2a and 2b show ring core evaluation fields, which are operatively equivalent to the ring core evaluation field indicated in FIG. 1, and wherein always two place markings are, in accordance with the invention, allocated to each core. Thus, the ring cores of the column T/E denote the thousands digits and also the units digits, and the cores of the column H/Z denote the hundreds digits and also the tens digits. As compared with the arrangement shown in FIG. 1, the number of columns has accordingly been reduced by one-half.

Whether the numbers denoted by the individual ring cores are to be evaluated respectively as thousands digits or units digits or as hundreds digits or tens digits, is established by the magnetization direction which is determined by the direction of threading (linking) of the evaluation loops. Upon assuming that the threading direction indicated by arrows at the respective loop starts A and the loop ends E denotes in all embodiments the positive threading direction, current passing through the cores from left to right, in positive threading direction, will determine the first marking, that is, respectively T and H, while current passing from right to left will determine the second marking noted after the fraction line, that is, respectively E and Z.

It may now happen that one and the same number (digit) appears at two different places within a digit combination, both of which are determined by the same core column, for example, T/E. In such case, the evaluation loop would have to be threaded twice, in opposite directions, through the same ring core, so that the sum energization would be equal to zero and the corresponding core would not produce any test result. In order to avoid this, the evaluation loop, for example, 2392, bypasses the core T/E2 in the return direction, as shown in FIG. 2a, or, as shown in FIG. 2b, this loop is threaded through (linked with) an auxiliary core ZK which is allocated to the corresponding column. The number which is first ascertained in a column is in both cases transmitted to the vacant place. The control of this transmission, depending upon a test result obtained at an auxiliary core ZK, has the advantage that the transmission of a digit cannot be simulated, for example, in the case of an inoperative signal receiver or other disturbance.

FIG. 3 shows a ring core evaluation field in which difficulties in the possible transmission of a digit are avoided from the outset by the provision of an individual ring core for each place. However, the number of rows has been reduced to one-half. To each core are allocated two numerical values (digits), for example, 1 and 6, which are likewise determined by the threading direction.

FIG. 4 shows a ring core evaluation field for an odd number of places per digit, combination, for example, the places H, Z and E. The columns Z and E are as in the embodiments according to FIGS. 2a or 2b, combined in one column, while the number of cores in the column H is reduced to one-half as in the embodiment shown in FIG. 3, so that one-half of the normally required ring cores is likewise sufficient in this example.

The determination of the two different magnetization directions can be effected, for example, with the aid of two parallel connected signal receivers, one of which responds operatively to positive and the other to negative voltage impulses, such impulses being induced in the readout winding, upon connection of a control pulse of definite polarity to the evaluation loop.

Changes may be made within the scope and spirit of the appended claims which define what is believed to be new and desired to have protected by Letters Patent.

We claim:
1. A circuit arrangement for number identification devices and number reforming devices in telephone systems and the like, comprising a single transformer matrix of ring-shaped transformer elements arranged in respective row and column coordinates, the coordinates of one type representing the individual digit position characteristic of a multi-digit number, and the other type of coordinates representing the individual value characteristics of each digit position, a marking conductor for each number involved, identifying the figure combination corresponding to the associated number, each such marking conductor forming a primary winding for a transformer element in each coordinate representing individual digit position, to effect a magnetization of desired direction of the associated element with at least one of such primary windings of each marking conductor being arranged to effect an element magnetization in a direction opposite to that of other elements associated with the particular conductor, at least one of said coordinates of at least one of said coordinate types having fewer transformer elements therein than the number of characteristics to be represented in such coordinate, each transformer element in such coordinate having two groups of primary windings respectively connected for opposite magnetizing direction, whereby the transformer elements in such coordinate represent either of two number characteristics depending upon the magnetizing direction in the involved transformer element.

2. A circuit arrangement according to claim 1, wherein each transformer element of the matrix has two groups of primary windings with opposite winding direction, each transformer element representing two number characteristics depending upon the direction of magnetization thereof, each of which is associated with a different marking conductor.

3. A circuit arrangement according to claim 1, wherein $n$ values are required for each digit position in the number involved, the transformer matrix being provided in each digit position coordinate $n/2$ or $(n-1)/2+1$ rows of transformer elements for the marking of the individual values respectively in accordance with an even or an odd total number of values.

4. A circuit arrangement according to claim 1, wherein $m$ digit positions are required within the number involved, the transformer matrix being provided with $m/2$ or $(m-1)/2+1$ columns of transformer elements for the marking of the individual positions respectively in accordance with an even or odd total number of digit positions.

5. A circuit arrangement according to claim 4, wherein in the case of determining a multi-digit number with one and the same value in two different digit positions represented by one transformer element, only one primary winding of the transformer element involved representing one digit position is energized by the associated marking conductor, and means for inserting the identified value at said transformer element in the other digit position.

References Cited by the Examiner
UNITED STATES PATENTS

| | | | |
|---|---|---|---|
| 2,953,778 | 9/1960 | Anderson et al. | 179—18 X |
| 2,992,421 | 7/1961 | Whitney | 179—18 X |
| 3,200,203 | 8/1965 | Bray et al. | 179—18.6 |

KATHLEEN H. CLAFFY, *Primary Examiner.*

L. A. WRIGHT, *Assistant Examiner.*